(12) United States Patent
Kim (10) Patent No.: US 10,760,476 B2
(45) Date of Patent: Sep. 1, 2020

(54) ENGINE SYSTEM AND METHOD OF CONTROLLING THE SAME

(71) Applicants: Hyundai Motor Company, Seoul (KR); Kia Motors Corporation, Seoul (KR)

(72) Inventor: Jang Hun Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/517,957

(22) Filed: Jul. 22, 2019

(65) Prior Publication Data

US 2020/0182135 A1  Jun. 11, 2020

(30) Foreign Application Priority Data

Dec. 7, 2018 (KR) .......... 10-2018-0157499

(51) Int. Cl.
| | |
|---|---|
| *F02B 29/06* | (2006.01) |
| *F02D 43/00* | (2006.01) |
| *F02B 29/02* | (2006.01) |
| *F02D 23/02* | (2006.01) |
| *F02B 41/00* | (2006.01) |
| *F02D 9/02* | (2006.01) |

(52) U.S. Cl.
CPC .............. *F02B 29/06* (2013.01); *F02B 29/02* (2013.01); *F02B 41/00* (2013.01); *F02D 23/02* (2013.01); *F02D 43/00* (2013.01); *F02D 2009/0222* (2013.01)

(58) Field of Classification Search
CPC .......... F02B 29/06; F02B 29/02; F02B 41/00; F02D 23/02; F02D 43/00; F02D 2009/0222
See application file for complete search history.

(56) References Cited

U.S. PATENT DOCUMENTS

| | | | | |
|---|---|---|---|---|
| 5,289,812 A | * | 3/1994 | Trombley | ........... F02D 7/02 123/533 |
| 5,381,760 A | * | 1/1995 | Simonds | ........... F02B 41/00 123/26 |
| 2006/0064981 A1 | * | 3/2006 | Kojima | ........... F02B 37/04 60/612 |

* cited by examiner

*Primary Examiner* — Syed O Hasan
(74) *Attorney, Agent, or Firm* — Morgan, Lewis & Bockius LLP (57) ABSTRACT

An engine system may include an engine including a plurality of combustion chambers generating driving torque by combustion of fuel, an intake line through which outside air supplied to the combustion chamber flows, an exhaust line for exhausting the exhaust gas from the combustion chamber to the outside, a turbocharger including a compressor mounted in the intake line and a turbine mounted in the exhaust line, an air supply passage through which a portion of the outside air branched from the intake line and supplied to the combustion chamber, an air supply nozzle connected to the air supply passage and supplying the part of the outside air to the combustion chamber, an air supply pump provided in the air supply passage and providing an injection pressure to the part of the outside air injected into the combustion chamber, and a controller for controlling the air supply nozzle and the air supply pump.

14 Claims, 5 Drawing Sheets

ENGINE SYSTEM AND METHOD OF CONTROLLING THE SAME

CROSS-REFERENCE TO RELATED APPLICATION

The present application claims priority to Korean Patent Application No. 10-2018-0157499 filed on Dec. 7, 2018, the entire contents of which is incorporated herein for all purposes by this reference.

BACKGROUND OF THE INVENTION

Field of the Invention

The present invention relates to an engine system and method of controlling the same. More particularly, the present invention relates to an engine system for supplying air in a combustion chamber of a diesel engine and a method of controlling the same.

Description of Related Art

An engine of a vehicle combusts a mixture of air inflowing from the outside and a fuel with an appropriate ratio to generate power.

In a process of generating the power by driving the engine, the external air for the combustion must be appropriately supplied to obtain a desired output and combustion efficiency. For this, a turbocharger as a device configured for turbocharging the air for the combustion to increase the combustion efficiency of the engine is used.

In general, a turbocharger is a device that rotates a turbine by use of pressure of exhaust gas discharged from an engine and thereby increases output of the engine by supplying high-pressure air to a combustion chamber by use of rotational force thereof. The turbocharger is applied to most diesel engines and has also recently been applied to gasoline engines.

As another example of an intake boost device, an electric supercharger using a motor to drive a compressor to compress external air has been used. Since the electric supercharger is driven by a battery, there is little boost, and it mainly supplies supercharged air to the combustion chamber in a low speed and low load region.

To solve the problem of deterioration of the air-fuel ratio (A/F) at the time of rapid acceleration and high load operation of the vehicle, the supercharger and the turbocharger are applied together to compress the air and supply the compressed air together with the fuel in the combustion chamber.

However, when the supercharger and the turbocharger are used together for the air compression, there is a problem that the device is expensive, the operation time is limited, the temperature of the compressed intake air is high, the amount of soot is increased, and the fuel consumption is reduced.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an engine system and method of controlling the same in which apply a turbocharger as an intake boost device configured for compressing intake air and supply air in a combustion chamber at a necessary time according to a driving condition of a vehicle.

An engine system according to an exemplary embodiment of the present invention may include an engine including a plurality of combustion chambers generating driving torque by combustion of fuel, an intake line through which outside air supplied to the combustion chamber flows, an exhaust line for exhausting the exhaust gas from the combustion chamber to the outside, a turbocharger including a compressor mounted in the intake line and a turbine mounted in the exhaust line, an air supply passage through which a portion of the outside air branched from the intake line and supplied to the combustion chamber, an air supply nozzle for spraying the air to the combustion chamber, an air supply pump provided in the air supply passage and providing an injection pressure to the part of the outside air injected into the combustion chamber, and a controller for controlling the air supply nozzle and the air supply pump so that air is injected into the combustion chamber according to the condition of the engine.

The engine system according to an exemplary embodiment of the present invention may further include an exhaust gas recirculation device including an EGR line connecting the intake line connected to the compressor of the turbocharger and the exhaust line connected to the turbine of the turbocharger, and an exhaust gas recirculation (EGR) cooler mounted in the EGR line.

The engine system according to an exemplary embodiment of the present invention may further include an air cleaner provided at an inlet of the intake line for filtering the outside air, an intercooler provided in a main intake line at a front end portion of an intake manifold of the engine and connected to the intake line, and cooling the outside air flowing through the main intake line, and an exhaust gas purifying device provided in the exhaust line at a rear end portion of an exhaust manifold of the engine for purifying the exhaust gas.

A throttle valve for controlling an amount of the outside air supplied to the combustion chamber may be mounted at an inlet of an intake manifold of the engine.

A 3-way EGR valve may be mounted in the intake line at a front end portion of the turbocharger to adjust an amount of the outside air drawn in from the intake line into the turbocharger according to an opening amount of the 3-way EGR valve.

An opening and closing valve which is opened or closed in accordance with a control signal of the controller and prevents the backflow of the part of the outside air. may be provided in the air supply passage.

The controller may be configured to control the air supply nozzle and the air supply pump such that air is injected into the combustion chamber under the condition that revolutions per minute of the engine exceeds set revolutions per minute and the combustion chamber pressure is less than a set pressure.

The set revolutions per minute may be 1500 rpm, and the set pressure may be 10 bar.

The controller may be configured to control the air supply nozzle and the air supply pump such that air is injected into the combustion chamber under the condition that coolant temperature of the engine exceeds a predetermined temperature.

The predetermined temperature may be 55° C.

A method of controlling an engine system according to an exemplary embodiment of the present invention may include detecting driving condition of the engine, determining whether the engine is in a condition of a rapid acceleration and a full load, determining whether revolutions per minute of the engine exceeds set revolutions per minute and the combustion chamber pressure is less than a set pressure if the engine is in a condition of a rapid acceleration and a full load, injecting air into the combustion chamber if the revolutions per minute exceeds the set revolutions per minute and the combustion chamber pressure is less than the set pressure, determining whether the coolant temperature of the engine exceeds a predetermined temperature, and injecting air into the combustion chamber if the coolant temperature of the engine exceeds the predetermined temperature.

The method according to an exemplary embodiment of the present invention may further include determining whether the engine is stopped, and maintaining normal driving if the engine is stopped.

The set revolutions per minute may be 1500 rpm, the set pressure may be 10 bar, and the predetermined temperature may be 55° C.

The driving condition of the engine may be revolutions per minute of the engine, combustion chamber pressure, and coolant temperature.

In the injecting air into the combustion chamber, high pressure air may be injected into the combustion chamber by an air supply pump.

In the injecting air into the combustion chamber, an air flow rate of 50 cc may be injected per cycle.

According to an exemplary embodiment of the present invention, by controlling the air to be injected into the combustion chamber according to the driving conditions of the engine, it is possible to prevent the deterioration of the air-fuel ratio during vehicle speed acceleration and high load operation, reducing the amount of smoke and improving fuel efficiency.

Furthermore, by applying only the turbocharger as the intake boost device, it is possible to reduce the manufacturing cost of the vehicle, and to solve the problem of the limitation of the operation time and the rise of the air temperature.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

Furthermore, in exemplary embodiments of the present invention, since like reference numerals designate like elements having the same configuration, various exemplary embodiments is representatively described, and in other exemplary embodiments of the present invention, only configurations different from the various exemplary embodiments will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. Furthermore, like structures, elements, or components illustrated in two or more drawings use like reference numerals for showing similar features. It will be understood that when an element such as a layer, film, region, or substrate is referred to as being "on" another element, it may be directly on the other element or intervening elements may also be present.

The exemplary embodiment of the present invention shows an exemplary embodiment of the present invention in detail. As a result, various modifications of the drawings will be expected. Therefore, the exemplary embodiment is not limited to a specific aspect of the illustrated region, and for example, includes modifications of an aspect by manufacturing.

Now, an engine system according to an exemplary embodiment of the present invention will be described with reference to FIG. 1 and FIG. 2.

Figure 1:
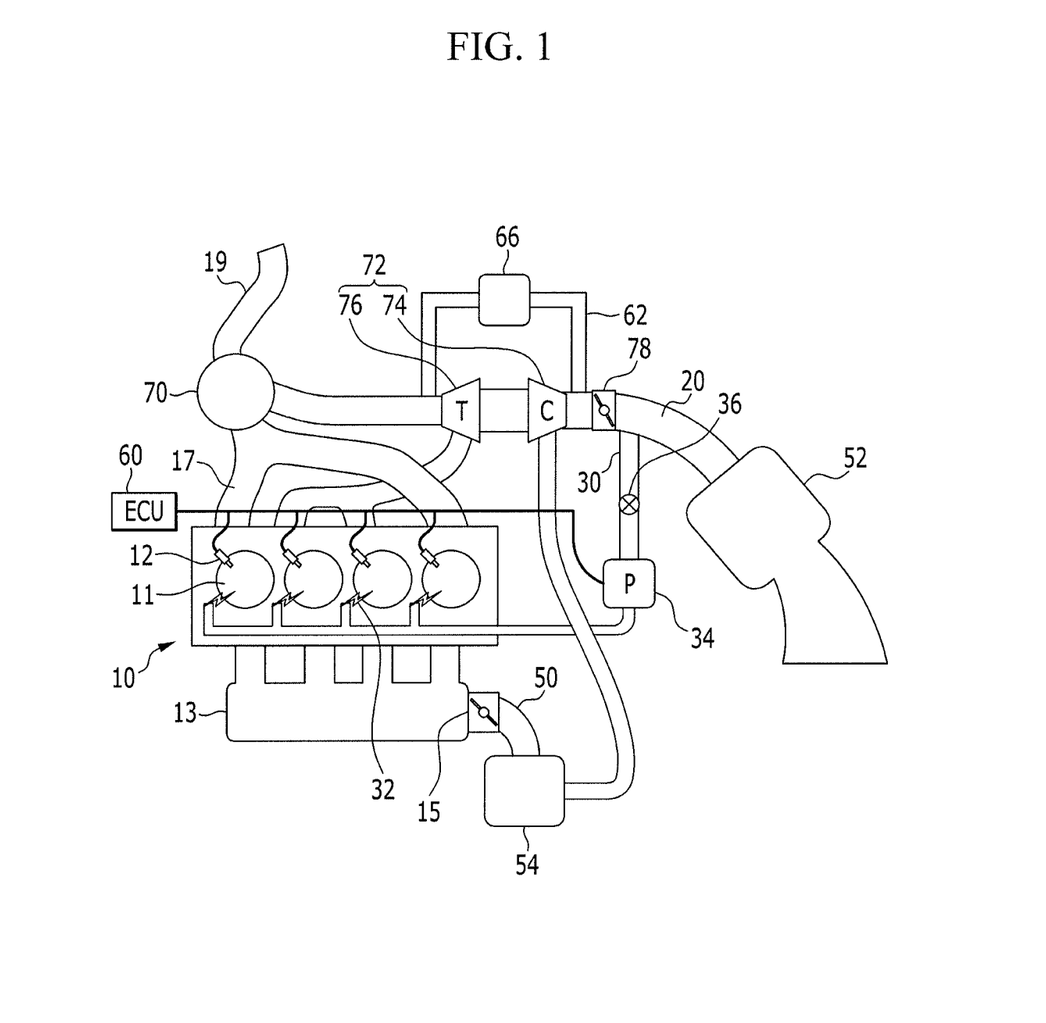
FIG. 1 is a conceptual diagram schematically showing an engine system according to an exemplary embodiment of the present invention.
Figure 2:
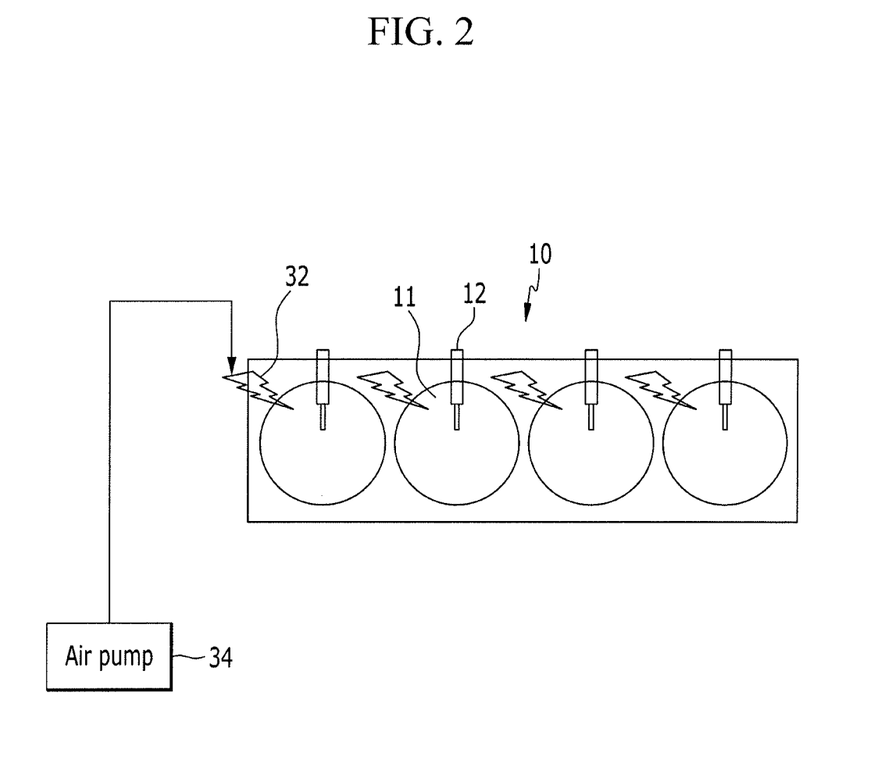
FIG. 2 is a conceptual diagram schematically showing an air supply structure according to an exemplary embodiment of the present invention.

FIG. 1 is a conceptual diagram schematically showing an engine system according to an exemplary embodiment of the present invention, and FIG. 2 is a conceptual diagram schematically showing an air supply structure according to an exemplary embodiment of the present invention.

Referring to FIG. 1 and FIG. 2, an engine system according to an exemplary embodiment of the present invention includes an engine 10, an intake line 20, an exhaust line 19, an exhaust manifold 17, a turbocharger 72, an air supply passage 30, an air supply nozzle 32, an air supply pump (air pump, 34) and a controller 60.

The engine 10 includes a plurality of combustion chambers 11 for generating a driving force by combustion of fuel, the intake air supplied to the combustion chamber 11 is supplied through the intake line 2, and the exhaust gas discharged from the combustion chamber 11 of the engine 10 is discharged to the outside through the exhaust manifold 17 and the exhaust line 19. At the instant time, an exhaust gas purifying device 70 may be provided in the exhaust line 19 for purifying the exhaust gas. Furthermore, fuel injectors 12 for injecting fuel into each of the plurality of combustion chambers 11 are provided.

Furthermore, an air cleaner 52 for filtering the outside air may be mounted at the inlet of the intake line 20.

The intake air flowing through the intake line 20 is supplied to the combustion chamber 11 through the intake manifold 13. A throttle valve 15 is mounted on the intake manifold 13 to regulate the air amount supplied to the combustion chamber 11. Furthermore, an intercooler 54 that cools the outside air flowing through the main intake line 50 may be mounted on the main intake line 50 at the front end portion of the intake manifold 13 of the engine 10.

The turbocharger 72 includes a compressor 74 mounted in the intake line 20 and a turbine 76 mounted in the exhaust line 19. The turbocharger 72 supplies the boosted air to the combustion chamber 11. The outside air introduced from the intake line 20 is compressed by the compressor 74 of the turbocharger 72 and is supplied to the combustion chamber 11 through the intake manifold 13. The turbine 76 of the turbocharger 72 is rotated by the pressure of the combustion gas discharged from the engine 10 and the outside air drawn in from the intake line 20 is pushed to a pressure higher than atmospheric pressure by use of the rotational force. The turbocharger 72 means a turbocharger or a supercharger.

On the other hand, a 3-way EGR valve 78 is mounted in the intake line 20 at the front end portion of the turbocharger 72 so that the amount of outside air drawn in from the intake line 20 into the compressor 74 of the turbocharger 72 may be adjusted according to the amount of opening of the 3-way EGR valve 78.

Furthermore, the engine system according to an exemplary embodiment of the present invention may further include an exhaust gas recirculation device including an EGR line 62 connecting the intake line 20 connected to the compressor 74 of the turbocharger 72 and the exhaust line 19 connected to the turbine 76 of the turbocharger 72, and an exhaust gas recirculation (EGR) cooler 66 mounted in the EGR line 62.

An exhaust gas recirculation device implemented by the EGR line 62 supplies a portion of the exhaust gas to the intake system of the engine 10 and into the combustion chamber 11 when it is necessary to reduce the amount of nitrogen oxides discharged according to the operating state of the engine 10. The exhaust gas which is an inert gas whose volume does not change relatively lowers the density of the mixture and the flame propagation speed is lowered when the fuel is burned so that the burning rate of the fuel is lowered and the rise of the combustion temperature is suppressed.

Through the air supply passage 30, a portion of the outside air branched from the intake line 20 and supplied to the combustion chamber 11, and the air supply nozzle 32 is connected to the air supply passage 30 and directly injects air into the combustion chamber 11.

An air supply pump 34 is provided in the air supply passage 30 to provide an injection pressure to the air injected into the combustion chamber 11.

An opening and closing valve 36 which is opened or closed in accordance with a control signal of the controller 60 and prevents the backflow of the part of the outside air. may be provided in the air supply passage 30.

The controller 60 controls the air supply nozzle 32 and the air supply pump 34 so that air is injected into the combustion chamber 11 according to the condition of the engine 10. At the instant time, the driving condition of the engine 10 may be revolutions per minute of the engine 10, combustion chamber 11 pressure, and coolant temperature.

The controller may be configured to control the air supply nozzle 32 and the air supply pump 34 such that air is injected into the combustion chamber 11 under the condition that the revolutions per minute of the engine 10 exceeds about 1500 rpm and the combustion chamber 11 pressure is less than about 10 bar.

Furthermore, the controller 60 may control the air supply nozzle 32 and the air supply pump 34 such that air is injected into the combustion chamber 11 under the condition that coolant temperature of the engine 10 exceeds 55° C.

Figure 3:
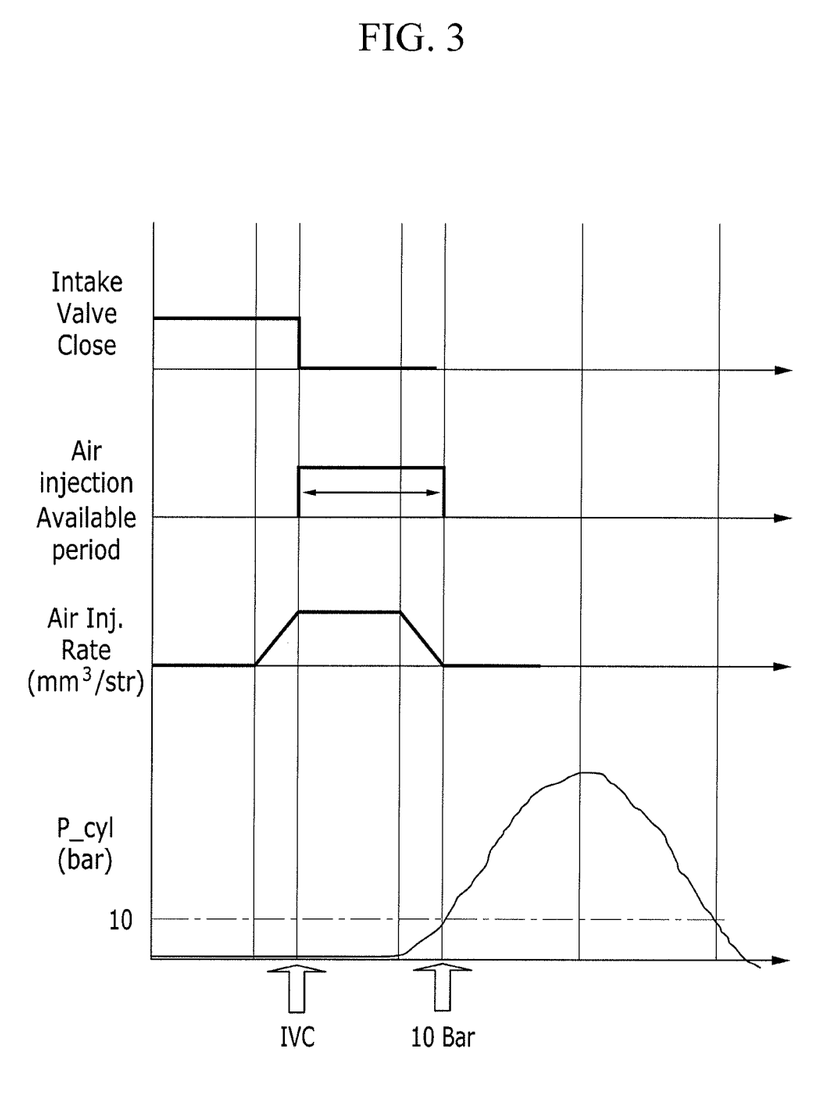
FIG. 3 is a graph showing the relationship between the intake valve opening and closing timing of the air supply available period, the air flow rate injected, and the combustion chamber pressure according to an exemplary embodiment of the present invention.
Figure 4:
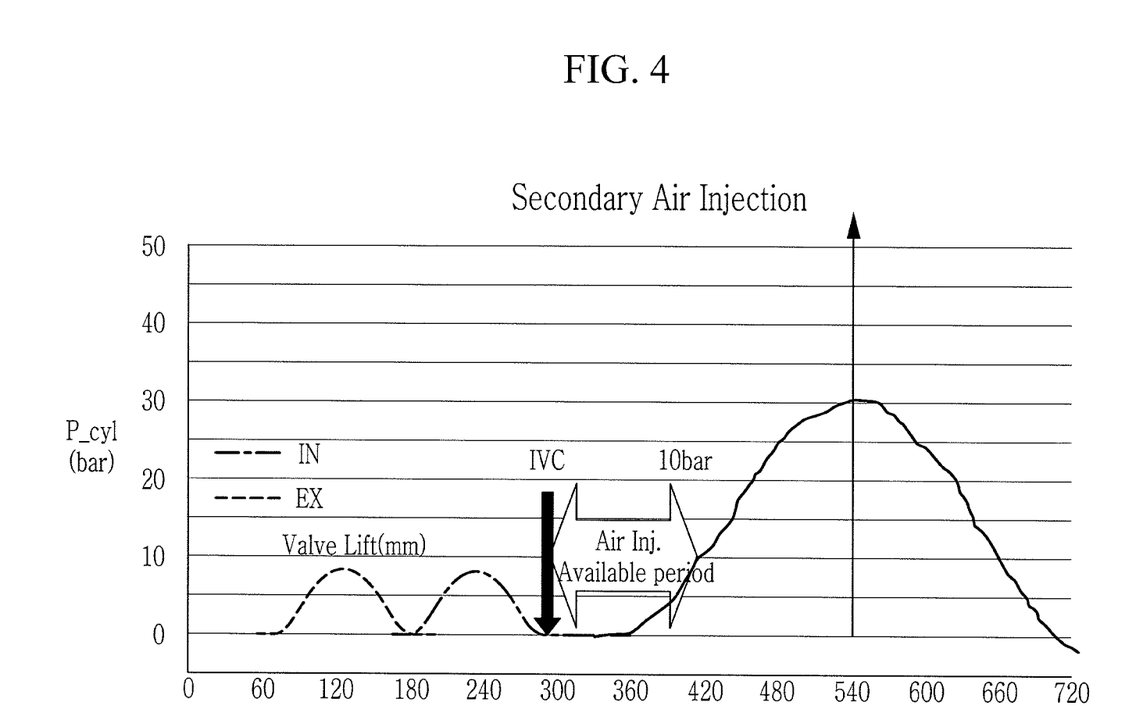
FIG. 4 is a graph showing the relationship between the intake valve opening and closing timing of the air supply available period and the combustion chamber pressure according to an exemplary embodiment of the present invention.

FIG. 3 is a graph showing the relationship between the intake valve opening and closing timing of the air supply available period, the air flow rate injected, and the combustion chamber pressure according to an exemplary embodiment of the present invention, and FIG. 4 is a graph showing the relationship between the intake valve opening and closing timing of the air supply available period and the combustion chamber pressure according to an exemplary embodiment of the present invention.

Referring to FIG. 3 and FIG. 4, the controller 60 can control the air supply nozzle 32 and the air supply pump 34 such that the air to be injected into the combustion chamber 11 under the condition that the intake valve is closed (IVC) and the boost pressure is applied to the turbocharger 72 and the pressure of the combustion chamber 11 is less than 10 bar. At the instant time, it is possible to control the injection of the air flow rate of 50 cc, that is, 50,000 mm3 per cycle (stroke) of the engine 10, into the combustion chamber 11 through the air supply nozzle 32.

Figure 5:
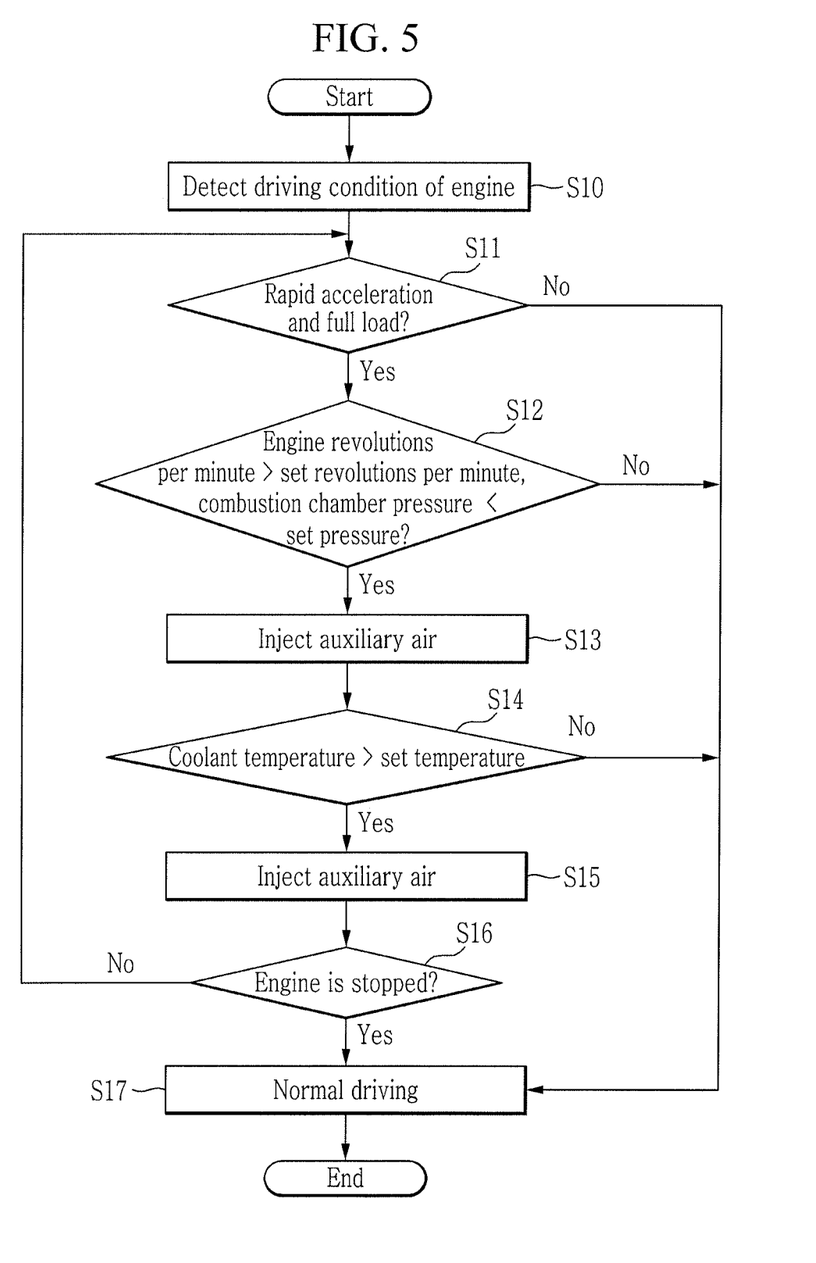
FIG. 5 is a flowchart illustrating a method of controlling an engine system according to an exemplary embodiment of the present invention.

FIG. 5 is a flowchart illustrating a method of controlling an engine system according to an exemplary embodiment of the present invention.

Referring to FIG. 5, firstly, driving condition of the engine is detected S10. The driving condition of the engine may be revolutions per minute of the engine, combustion chamber pressure, and coolant temperature.

As such, whether the engine is in a condition of a rapid acceleration and a full load based on the driving condition is determined S11, if the engine is not in a condition of a rapid acceleration or a full load, normal driving is continued S17, and if the engine is in a condition of a rapid acceleration and a full load, whether the engine revolutions per minute exceeds 1500 rpm and the combustion chamber pressure is less than 10 bar is determined S12.

As such, if the engine revolutions per minute is less than 1500 rpm or the combustion chamber pressure exceeds than 10 bar, normal driving is continued S17, and if the engine revolutions per minute exceeds 1500 rpm and the combustion chamber pressure is less than 10 bar, air is injected into the combustion chamber S13.

As such, whether the coolant temperature of the engine exceeds 55° C. is determined S14.

As such, if the coolant temperature of the engine is less than 55° C., normal driving is continued S17, and if the coolant temperature of the engine exceeds 55° C., air is injected into the combustion chamber S15.

As such, whether the engine is stopped is determined S16, if the engine is not stopped, whether the engine is in a condition of a rapid acceleration and a full load is determined S11, and if the engine is stopped, normal driving is continued S17.

In an exemplary embodiment of the present invention, the rapid acceleration is a state in which the engine rotates with an acceleration greater than a predetermined value of acceleration, and the full load is a state in which the engine rotates with a greater than a predetermined value of load.

The steps of injecting the air into the combustion chamber S13 and S15 may be controlled to inject high pressure air having a pressure higher than a predetermined pressure directly into the combustion chamber by the air supply pump, and it is possible to control the injection of the air flow rate of 50 cc, that is, 50,000 mm3 per cycle (stroke) of the engine 10, into the combustion chamber 11 through the air supply nozzle 32.

Like this, according to an exemplary embodiment of the present invention, by controlling the air to be injected into the combustion chamber according to the driving conditions of the engine, it is possible to prevent the deterioration of the air-fuel ratio during vehicle speed acceleration and high load operation, reducing the amount of smoke and improving fuel efficiency.

Furthermore, by applying only the turbocharger as the intake boost device, it is possible to reduce the manufacturing cost of the vehicle, and to solve the problem of the limitation of the operation time and the rise of the air temperature.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An engine system comprising: an engine including a plurality of combustion chambers generating driving torque; an intake line connected to the plurality of combustion chambers and through which outside air supplied to the plurality of combustion chambers flows; an exhaust line connected to the plurality of combustion chambers and configured for exhausting an exhaust gas from the plurality of combustion chambers to an outside of the plurality of combustion chambers; a turbocharger including a compressor mounted in the intake line and a turbine mounted in the exhaust line; an air supply passage connected to the intake line between an exhaust gas recirculation (EGR) valve and an air cleaner and through which a part of the outside air is supplied to the plurality of combustion chambers; an air supply nozzle connected to the air supply passage and supplying the part of the outside air directly to the plurality of combustion chambers; an air supply pump provided in the air supply passage and providing an injection pressure to the part of the outside air injected into the plurality of combustion chambers; and a controller connected to the air supply nozzle and the air supply pump and configured for controlling the air supply nozzle and the air supply pump so that the part of the outside air is injected into the plurality of combustion chambers according to a condition of the engine; and an exhaust gas recirculation device having: an exhaust gas recirculation (EGR) line connecting the intake line connected to the compressor of the turbocharger and the exhaust line connected to the turbine of the turbocharger; and an EGR cooler mounted in the EGR line, wherein the air cleaner is provided at an inlet of the intake line for filtering the outside air, and wherein an intercooler is provided in a main intake line positioned at a front end portion of an intake manifold of the engine and connected to the intake line and the intake manifold, and cooling the outside air flowing through the main intake line; and wherein an exhaust gas purifying device provided in the exhaust line at a rear end portion of an exhaust manifold of the engine for purifying the exhaust gas.

2. The engine system of claim 1, wherein a throttle valve for controlling an amount of the outside air supplied to the plurality of combustion chambers is mounted at an inlet of the intake manifold of the engine.

3. The engine system of claim 1, wherein a 3-way EGR valve is mounted in the intake line at a front end portion of the turbocharger to adjust an amount of the outside air drawn in from the intake line into the turbocharger according to an opening amount of the 3-way EGR valve.

4. The engine system of claim 1, further including an opening and closing valve which is provided in the air supply passage, and selectively opened or closed in accordance with a control signal of the controller to prevent a backflow of the part of the outside air.

5. The engine system of claim 1, wherein the controller is configured to control the air supply nozzle and the air supply pump so that the part of the outside air is injected into the plurality of combustion chambers under the condition that revolutions per minute (RPM) of the engine exceeds predetermined RPM and a pressure in the plurality of combustion chambers is less than a predetermined pressure.

6. The engine system of claim 5, wherein the predetermined RPM is 1500 rpm, and the predetermined pressure is 10 bar.

7. The engine system of claim 1, wherein the controller is configured to control the air supply nozzle and the air supply pump so that the part of the outside air is injected into the plurality of combustion chambers under the condition that a coolant temperature of the engine exceeds a predetermined temperature.

8. The engine system of claim 7, wherein the predetermined temperature is 55° C.

9. A method of controlling an engine system, the method comprising: detecting driving condition of the engine system including an air supply passage connected to an intake line between an exhaust gas recirculation (EGR) valve and an air cleaner and through which a part of an outside air is supplied to a plurality of combustion chambers, and an air supply nozzle connected to the air supply passage and supplying the part of the outside air directly to the plurality of combustion chambers; determining, by a controller, when the engine is in a condition of a rapid acceleration and a full load, based on the detected driving condition; determining, by the controller, when revolutions per minute (RPM) of the engine exceeds predetermined RPM and a pressure in the plurality of combustion chambers is less than a predetermined pressure in a response that the engine is in the condition of the rapid acceleration and the full load; injecting air into the plurality of combustion chambers in a response that the RPM of the engine exceeds the predetermined RPM and the pressure in the plurality of combustion chambers is less than the predetermined pressure; determining, by the controller, when a coolant temperature of the engine exceeds a predetermined temperature; and injecting air into the plurality of combustion chambers in a response that the coolant temperature of the engine exceeds the predetermined temperature.

10. The method of claim 9, further including:
determining, by the controller, when the engine is stopped; and
maintaining, by the controller, normal driving when the engine is stopped.

11. The method of claim 9,
wherein the predetermined revolutions per minute is 1500 rpm, the predetermined pressure is 10 bar, and the predetermined temperature is 55° C.

12. The method of claim 9,
wherein the driving condition of the engine includes the RPM of the engine, the pressure in the plurality of combustion chambers, and the coolant temperature.

13. The method of claim 9,
wherein in the injecting air into the plurality of combustion chambers, an air having a pressure higher than a predetermined pressure is injected into the plurality of combustion chambers by an air supply pump.

14. The method of claim 9,
wherein in the injecting air into the plurality of combustion chambers, the air having a flow rate of 50 cc is injected per cycle.

* * * * *